US008423817B2

(12) United States Patent
McKelvey et al.

(10) Patent No.: US 8,423,817 B2
(45) Date of Patent: Apr. 16, 2013

(54) METHOD, SYSTEM, AND DEVICE FOR RESETTING NETWORK ELEMENTS

(75) Inventors: Henry A. McKelvey, Capitol Heights, MD (US); Jimmie D. Peterman, Glenndale, MD (US); Rosa M. Underwood, Washington, DC (US); Emory L. Young, Reisterstown, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1273 days.

(21) Appl. No.: 12/041,844

(22) Filed: Mar. 4, 2008

(65) Prior Publication Data
US 2009/0228696 A1    Sep. 10, 2009

(51) Int. Cl.
*G06F 11/00*    (2006.01)
(52) U.S. Cl.
USPC .............................................. 714/4.3; 714/23
(58) Field of Classification Search .................. 714/4.1, 714/4.11, 4.21, 4.3, 4.4, 13, 23, 43; 713/1, 713/2; 398/1; 709/221
See application file for complete search history.

(56) References Cited

U.S. PATENT DOCUMENTS

| | | | | |
|---|---|---|---|---|
| 6,449,731 B1 * | 9/2002 | Frey, Jr. | ....................... | 714/6.24 |
| 6,754,855 B1 * | 6/2004 | Denninghoff et al. | .......... | 714/48 |
| 6,931,558 B1 * | 8/2005 | Jeffe et al. | ..................... | 713/340 |
| 7,062,676 B2 * | 6/2006 | Shinohara et al. | .............. | 714/15 |
| 7,487,343 B1 * | 2/2009 | Insley et al. | ....................... | 713/1 |
| 7,487,383 B2 * | 2/2009 | Bensinger | .................... | 714/4.11 |
| 2002/0083316 A1 * | 6/2002 | Platenberg et al. | ............... | 713/2 |
| 2003/0005351 A1 * | 1/2003 | Lim | .................................. | 714/4 |
| 2004/0059805 A1 * | 3/2004 | Dinker et al. | .................. | 709/223 |

* cited by examiner

*Primary Examiner* — Scott Baderman
*Assistant Examiner* — Joseph Kudirka

(57) ABSTRACT

A system and method in accordance with exemplary embodiments may include detecting a fault associated with a network element that is communicatively coupled to a network. After detecting the fault, the network element may receive a reset signal in response to the fault detection. After receiving the reset signal, the network element may store a new image of an operating system of the network element into memory associated with the network element. After storing the new image, the network element may reboot. During reboot, the method may load the stored new image of the operating system from memory associated with the network element.

20 Claims, 6 Drawing Sheets

METHOD, SYSTEM, AND DEVICE FOR RESETTING NETWORK ELEMENTS

BACKGROUND INFORMATION

In the event a network element, e.g., an optical network terminal, becomes unresponsive and/or latched up, the network element may need to be rebooted. In many cases, rebooting a network element may cause the network element to recover from the unresponsive and/or latched up condition. However, ungracefully rebooting the network element may be harmful to the kernel associated with the operating system of the network element. Accordingly, ungracefully rebooting network elements through power cycling has become the less desired method of re-initialization.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which.

These and other embodiments and advantages will become apparent from the following detailed description, taken in conjunction with the accompanying drawings, illustrating by way of example the principles of the various exemplary embodiments.

DETAILED DESCRIPTION OF PREFERRED EMBODIMENTS

A system and method in accordance with exemplary embodiments may include detecting a fault associated with a network element that is communicatively coupled to a network. After detecting the fault, the network element may receive a reset signal in response to the fault detection. After receiving the reset signal, the network element may store a new image of an operating system of the network element into memory associated with the network element. After storing the new image, the network element may reboot. During reboot, the method may load the stored new image of the operating system from memory associated with the network element.

The description below describes elements of a network that may include one or more modules, some of which are explicitly shown in the figures, others that are not. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

The description below also describes physical and logical elements of a network, some of which are explicitly shown in figures, others that are not. The inclusion of some physical elements of a network system may help illustrate how a given network may be modeled. It should be noted, however, that all illustrations are purely exemplary and that the network scheme described herein may be performed on different varieties of networks which may include different physical and logical elements.

Figure 1:
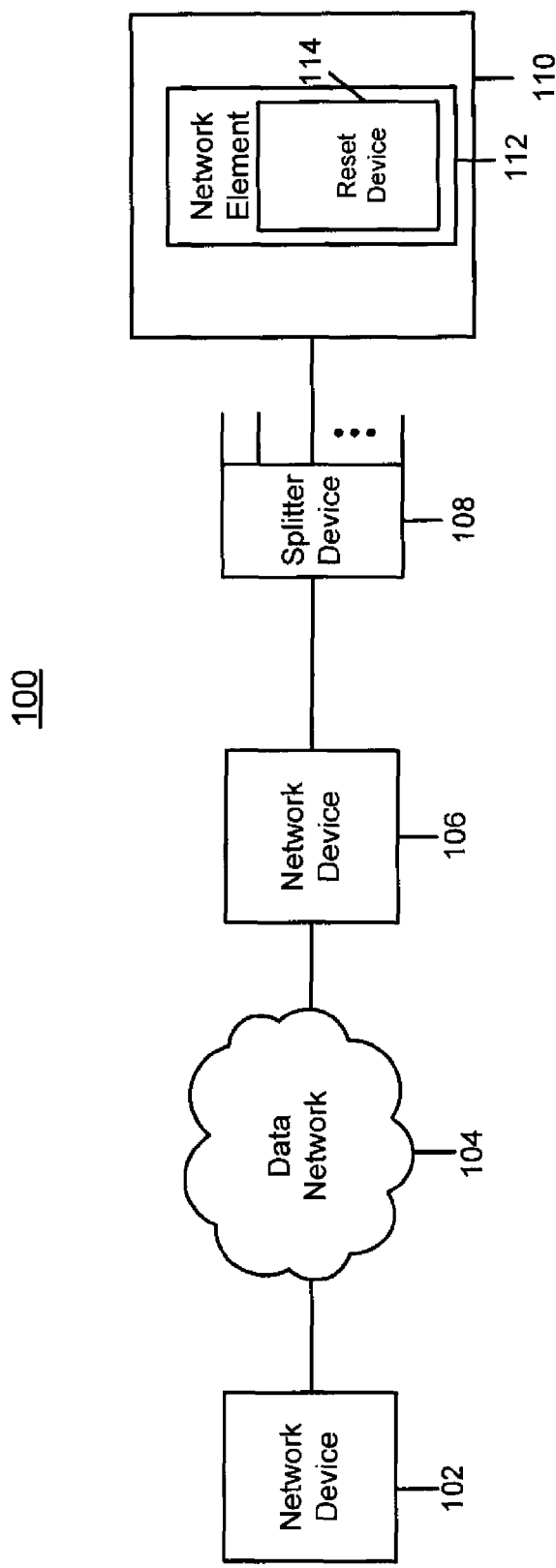
FIG. 1 illustrates a passive optical network (PON) having a network element reset topology, in accordance with exemplary embodiments.

For instance, network 100 from FIG. 1 illustrates a simplified view of a passive optical network and various elements in the passive optical network. It is noted that other hardware and software not depicted may be included in network 100. It is also noted that network 100 illustrates a specific number of instances of service provider systems, network elements, splitter devices, and/or data networks. It will be appreciated that a single instance and/or multiple instances of these entities may be included in a network.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof.

In an exemplary embodiment, a network element associated with a passive optical network (PON) may become latched-up and/or unresponsive due to rogue processes associated with an operating system of the network element and/or any other processes that may cause faults to occur within the network element. Rogue processes may include any process that becomes disconnected from a main process. This may include processes that run away and/or lose control from the main process. For example, rogue processes may include processes which begin to run and/or function apart from a main and/or central process that many have initiated the actual process. Resetting the network element may cause the network element to recover from a latch-up condition and/or unresponsive condition.

In an exemplary embodiment, a network element may be manually reset at the end-user's site by activating a reset toggle associated with the network element. A reset toggle may include a reset button, reset pin, and/or any other device that may activated to initiate a reset signal. The reset toggle may be concealed to prevent inadvertent activation of the reset toggle. For example, an end-user may detect a failure in one or more services provided to the end-user's site through the network element. The end-user may reset the network element based on this detection. For example, the end-user may contact one or more technicians associated with the service provider. Based on a determination that the network element is in a latched-up condition and/or unresponsive condition, the one or more technicians may inform the end-user of the location of the concealed reset button. Accordingly, the one or more technicians may instruct the end-user to manually reset the network element by activating the reset button (e.g., pressing the reset button).

In another exemplary embodiment, a network element may be remotely reset by remotely initiating a reset signal and transmitting the reset signal to the network element. For example, one or more technicians associated with a service provider system may determine that the network element is in a latched-up condition and/or unresponsive condition using the service provider system. The service provider system may include a computer system that is remote from the site of the network element. The service providers system may be associated with the passive optical network (PON). Based on the determination that the network element is in a latched-up condition and/or unresponsive condition, the one or more technicians may initiate one or more reset signals using the service provider system. The one or more reset signals may be transmitted through one or more passive optical networks (PONs) to the network element. Accordingly, the reset button associated with the network element may be activated upon receipt of the one or more reset signals.

FIG. 1 illustrates a network 100 having a network element reset topology in accordance with exemplary embodiments. The network element reset topology may include one or more service provider systems 102, one or more data networks 104, one or more network elements 106, one or more splitter devices 108, and one or more buildings 110 associated with one or more network elements 112.

The network element reset topology may be in communication with the data network 104. The data network 104 may include one or more of a local area network (LAN), a wide area network (WAN), the Internet, cellular networks, satellite networks, a passive optical network or other networks that permit the transfer and/or reception of data. The data network 104 may utilize one or more protocols of network clients. The data network 104 may also translate to or from other protocols to one or more protocols of network clients. In exemplary embodiments, the data network 104 may include one or more of the exemplary networks recited above operating as a stand-alone network or in cooperation with each other. Use of the term network herein is not intended to limit the network to a single network.

Service provider system 102 and network element 106 may be in communication with or have access to one or more data networks 104. For example, service provider system 102 and network element 106 may communicate with each other using one or more data networks 104.

Service provider system 102 may include, but is not limited to, a computer device or communications device including, e.g., a personal computer (PC), a workstation, a mobile device, a phone, a handheld PC, a personal digital assistant (PDA), a thin system, a fat system, network appliance, an Internet browser, a paging device, an alert device, a television, an interactive television, a receiver, a tuner, a high definition (HD) television, an HD receiver, a video-on-demand (VOD) system, a server, and/or any other device that is configured to receive alarm signals, alive signals, and/or pinging response signals from the network element 112 and/or transmit pinging request signals and/or reset signals to the network element 112 using the data network 104. Alive signals may include signals periodically transmitted from one or more network elements 112 while the network element 112 is in proper working condition.

In an exemplary embodiment, service provider system 102 may include software and/or hardware configured to receive one or more alarm signals from the network element 112 when the network element 112 is in a latched-up and/or unresponsive condition. A latched-up condition may include a condition that exists when digital logic of a circuit becomes stuck or frozen in a single state (e.g., on, off, etc.). For example, a latched-up condition may include a condition in which a device may be incapable of switching to an alternate state of functionality such as, when an AND gate cannot move from "off" state to an "on" state despite the values of its inputs. An unresponsive condition may include a condition in which hardware and/or software may not respond to data input and/or any other electronic stimuli, such as, control signals or interrupts. For example, an unresponsive condition may include delays in instruction acknowledgement, ignoring of data interrupts, such as, those that may be issued on a control bus, and/or a logical system shutdown, without a reboot condition (e.g., system freeze, blue screening etc.). The alarm signals may include one or more identifiers and/or signals that reference the identity of the network element 112 transmitting the alarm signal. Based on the alarm signal, a technician associated with the service provider system 102 may initiate a reset signal to be transmitted to the network element 112 using the service provider system 102.

In an exemplary embodiment, the technician may contact the customer associated with the network element 112 to instruct the customer on how to reset the network element 112. In an additional exemplary embodiment, the customer may contact a technician associated with the service provider system 102 to receive instructions on how to reset the network element 112. Service provider system 102 may also be configured to continuously poll to determine whether an alarm signal associated with the network element 112 has been received.

Service provider system 102 may also include software and/or hardware configured to receive one or more alive signals from the network element 112 via the data network 104. Alive signals may include signals periodically transmitted from one or more network elements 112 while the network element 112 is in proper working condition. Service provider system 102 may also include software and/or hardware configured to transmit one or more pinging request signals to the network element 112 in response to not receiving any alive signals from the network element 112 for a predetermined period of time.

The network element 106 may include software and/or hardware configured to transmit signals to and/or receive signals from a network. In an exemplary embodiment, the network element 106 may be configured to transmit and/or receive optical signals. For example, the network element 106 may include one or more optical line terminals. The network element 106 may be configured to receive signals from and/or transmit signals to the data network 104. The network element 106 may be configured to receive signals from and/or transmit signals to the splitter/combiner device 108.

The splitter/combiner device 108 may include software and/or hardware configured to split and/or combine signals. In an exemplary embodiment, the splitter/combiner device 108 may be configured to split and/or combine optical signals. For example, the splitter/combiner device 108 may split a signal by transmitting and/or broadcasting the signal to a plurality of network elements. In yet another example, the splitter/combiner device 108 may combine one or more signals received from one or more network elements. The splitter/combiner device 108 may be configured to receive signals from and/or transmit signals to the network element 106. The splitter/combiner device 108 may also be configured to receive signals from and/or transmit signals to the network element 112.

The building 110 may be an office building, multi-family dwelling, and/or other building receiving network service. The building 110 may contain and/or be communicatively coupled with one or more network elements 112, which may be residential gateways, routers, optical network terminals (ONTs), customer premise equipment (CPE), optical network units (ONUs), and/or other network equipment enabling the connection of one or more end user devices to a network.

The network element 112 may include software and/or hardware configured to transmit signals to and/or receive signals from the data network 104. The network element 112 may also include software and/or hardware configured to provide native service interfaces to an end-user. For example, the network element 112 may be configured to provide end-user services such as, telephony, Ethernet data, and/or video. In an exemplary embodiment, the network element 112 may include one or more optical network terminals (ONTs).

The network element 112 may include a network element reset device 114 for resetting the network element 112 in the event the network element 112 is in a latched-up and/or unresponsive condition. The network element 112 may include software and/or hardware configured to transmit alarm signals, pinging response signals, and/or alive signals to the service provider system 102 via the data network 104. The network element 112 may also include software and/or hardware configured to receive reset signals and/or pinging request signals from the service provider system 102 via the data network 104. The network element 112 and the network element reset device 114 are discussed in greater detail below.

The various components of a network 100 having a network element reset system as shown in FIG. 1 may be further duplicated, combined and/or integrated to support various applications and platforms. Additional elements may also be implemented in the systems described above to support various applications.

Figure 2:
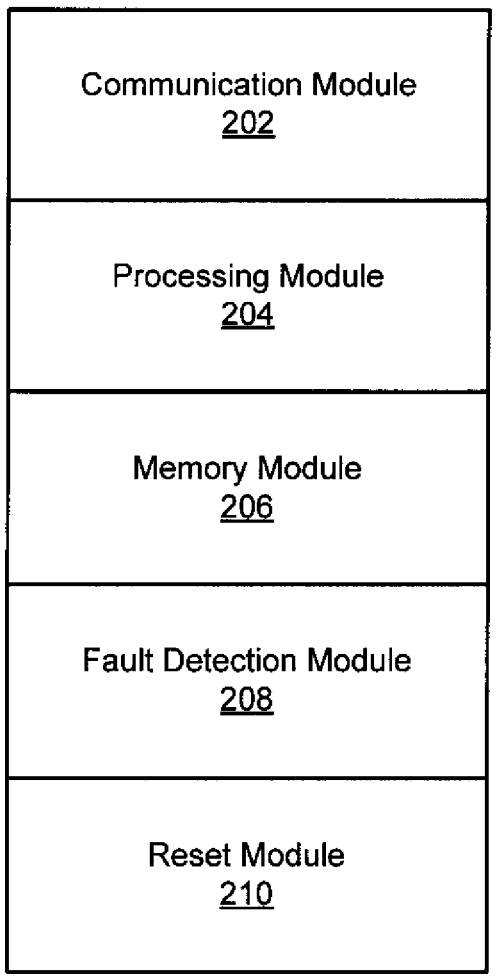
FIG. 2 illustrates exemplary modules of a network element configured to receive a reset signal, in accordance with exemplary embodiments.

FIG. 2 illustrates various modules of the network element configured to receive a reset signal in accordance with exemplary embodiments. In an exemplary embodiment, the network element 112 may include a communication module 202, a processing module 204, a memory module 206, a fault detection module 208, and a reset module 210. It is noted that the modules 202, 204, 206, 208, and 210 are exemplary. The functions of the modules 202, 204, 206, 208, and 210 may be performed at other modules remote or local to the network element 112, and the modules 202, 204, 206, 208, and 210 may be combined and/or separated.

The fault detection module 208 may include software and/or hardware to continuously monitor the condition of the processing module 204. Accordingly, the fault detection module 208 may include software and/or hardware configured to determine if the processing module 204 is in a latched-up condition and/or unresponsive condition.

In an exemplary embodiment, the fault detection module 208 may detect a latched-up condition and/or unresponsive condition by receiving one or more error signals from the processing module 204. Error signals may include information in the form of electrical signals indicating that the processing module 204 is in a latched-up condition and/or unresponsive condition. For example, if the processing module 204 becomes latched-up and/or unresponsive, the processing module 204 may transmit one or more error signals to the fault detection module 208. Based on receipt of one or more error signals, the fault detection module 208 may determine that the processing module 204 is in a latched-up condition and/or unresponsive condition.

In another exemplary embodiment, the fault detection module 208 may detect a latched-up condition and/or unresponsive condition by periodically transmitting one or more status signals to the processing module 204. Status signals may include status requests in the form of electrical signals requesting the processing module 204 to indicate the current condition of the processing module 208. For example, if the processing module 204 becomes latched-up and/or unresponsive, the processing module 204 may fail to respond to one or more status signals. In another example, if the processing module 204 becomes latched-up and/or unresponsive, the processing module 204 may transmit one or more status response signals indicating that the processing module 204 is in a latched-up condition and/or unresponsive condition. Based on receipt of one or more status response signals indicating that the processing module 204 is in a latched-up condition and/or unresponsive condition, the fault detection module 208 may determine that the processing module 204 is in a latched-up condition and/or unresponsive condition.

The fault detection module 208 may also include software and/or hardware configured to periodically transmit one or more alive signals to the service provider system 102 via the data network. Alive signals may include information in the form of electrical signals indicating that the processing module 208 is not in a latched-up condition or an unresponsive condition. For example, the fault detection module 208 may continue to transmit one or more alive signals to the service provider system 102 based on a determination that the processing module 204 is not in a latched-up condition or unresponsive condition.

The fault detection module 208 may also include software and/or hardware configured to respond to pinging requests signals transmitted from one or more systems external to the network element 112. For example, in response to failing to receive one or more alive signals from the network element 112, the service provider system 102 may transmit one or more pinging request signals to the network element 112 to test if the network element 112 is functioning properly. In another example, in response to receiving one or more alarm signals from the network element 112, the service provider system 102 may transmit one or more pinging request signals to the network element 112 to test if the network element 112 is accessible. Pinging request signals may include one or more signals used to determine if a network element 112 is accessible across a network. If, for example, the fault detection module 208 has determined that the processing module 204 is not in a latched-up condition or in an unresponsive condition, the fault detection module 208 may transmit an alive signal and/or a pinging response signal to indicate that the network element 112 is accessible and responsive. If, however, the fault detection module 208 has determined that the processing module 204 is in a latched-up condition and/or unresponsive condition, the fault detection module 208 may not transmit an alive signal and/or may transmit a pinging response signal to indicate that the network element 112 is not accessible and is unresponsive.

The fault detection module 208 may also include software and/or hardware configured to initiate an alarm signal in the event the fault detection module 208 has detected that the processing module 204 is in a latched-up and/or unresponsive condition. In an exemplary embodiment, the fault detection module 208 may utilize the communication module 202 to transmit an alarm signal to the service provider system 102 using the data network 104.

The processing module 204 may include one or more central processing units (CPUs) configured to execute one or more instructions for the operation of an operating system associated with the network element 112. The processing module 204 may include software and/or hardware configured to receive one or more status signals from the fault detection module 208. The processing module 204 may also include software and/or hardware configured to transmit one or more errors signals and/or status response signals to the fault detection module 208.

The processing module 204 may utilize one or more instructions, program code or data which may be stored in memory module 206. The memory module 206 may include read only memory (ROM) or firmware. The memory module 206 may also include random access memory (RAM), disk, tape or other storage for containing a processor readable medium. The memory module 206 may also include flash memory. The memory module 206 may include a combination of RAM, ROM, flash, and other storage. The memory module 206 may store an operating system and/or other software. The memory module 206 may also store a device assigned unique identifier and may contain encryption information such as an encryption key, a public key, a shared secret, a digital certificate and/or any other data that may be used as encryption information.

The reset module 210 may include software and/or hardware configured to receive one or more reset signals initiated at the service provider system 102 and/or initiated at the network element 112 by a technician and/or a customer. The reset module 210 may also include software and/or hardware configured to reset the network element 112 based on the determination that the network element 112 is in a latched-up condition and/or unresponsive condition. Reset signals may include one or more signals to initiate the graceful rebooting of the network element 112. Graceful rebooting may include a re-initialization cycle that stores a new image of the operating system in memory prior to rebooting. Upon rebooting, the new image may be accessed and initialized. Reset signals may also include information, in the form of electrical signals, indicating to which specific network element 112 the reset signal is directed.

Upon receiving one or more reset signals, the reset module 210 may include software and/or hardware configured to activate an interrupt pin associated with the network element reset device 114. An interrupt pin may include a pin of the reset circuit associated with gracefully resetting the network element 112. In an exemplary embodiment, the interrupt pin may be positive voltage activated. In another embodiment, the interrupt pin may be ground voltage activated.

The reset module 210 may also include software and/or hardware configured to store a new image of the operating system associated with the network element 112 in memory upon receipt of one or more reset signals. The reset module 210 may also include software and/or hardware configured to access and initialize the new image of the operating system that was previously stored in memory during the rebooting process.

The communication module 202 may communicate alive signals, alarm signals, and/or pinging response signals from the network element 112 to the data network 104. The communication module 202 may also communicate messages received from the other modules 204, 206, 208, and 210 to the data network 104, and may communicate messages to the other modules 204, 206, 208, and 210 received from the data network 104.

Figure 3:
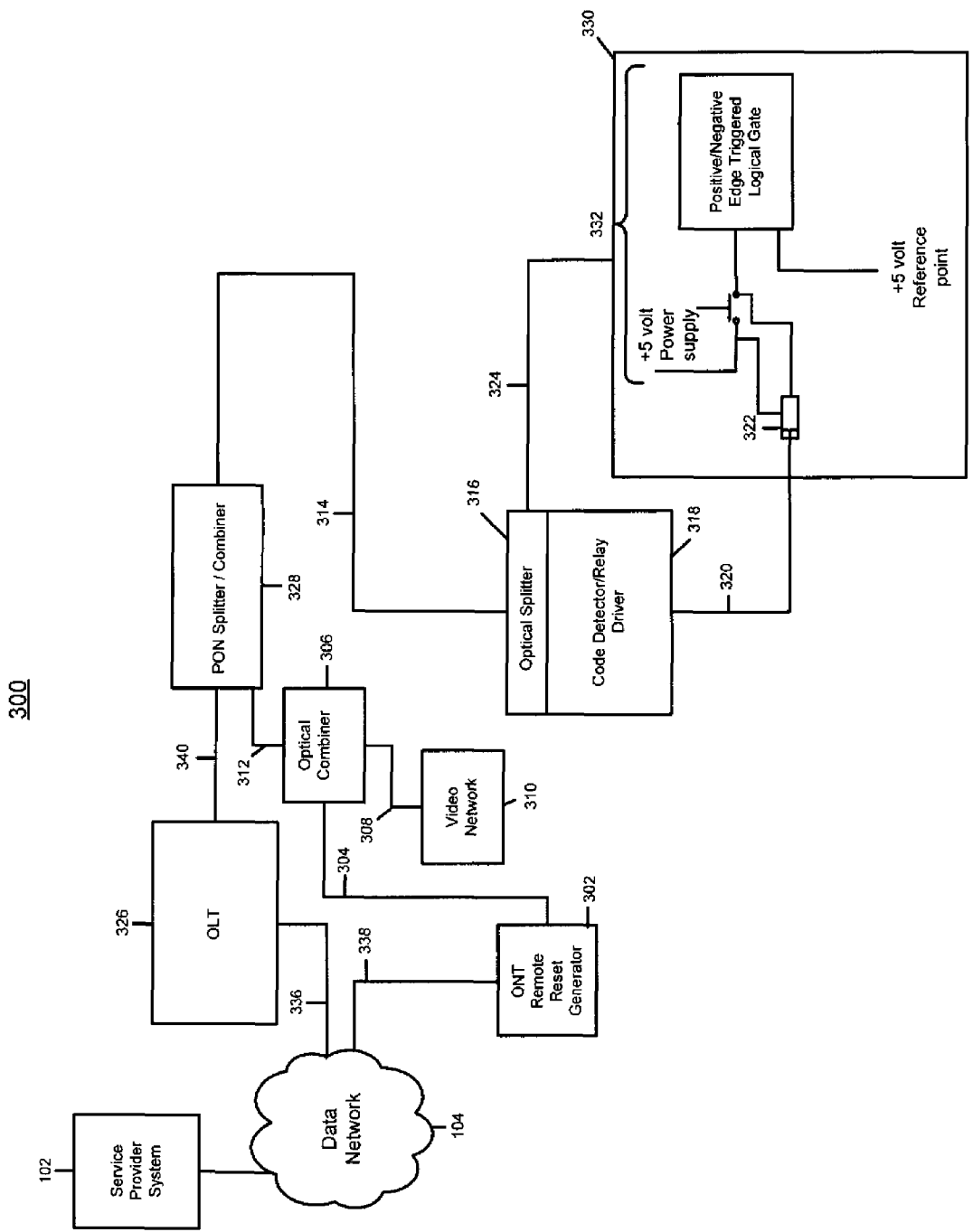
FIG. 3 illustrates a network element reset topology of a passive optical network (PON) configured to remotely reset a network element, in accordance with exemplary embodiments.

FIG. 3 illustrates a network element reset topology of a network configured to remotely reset a network element, in accordance with exemplary embodiments. Network 300 may be associated with a passive optical network (PON). The network 300 may include one or more network elements that are operable to gracefully reset network element 112. The network 300 may include one or more service provider systems 102, one or more data networks 104, one or more OLTs 326, one or more ONT remote reset generators 302, one or more video data networks 310, one or more optical combiners 306, one or more passive optical network (PON) splitter/combiners 328, one or more optical splitters 316, one or more code detector/relay drivers 318, one or more ONTs 330 containing one or more ONT reset devices 332, and/or one or more high speed relays 322.

As illustrated, a service provider system 102 may be communicatively coupled to the data network 104 via data path 334. Accordingly, the service provider system 102 may transmit signals to and/or receive signals from the remainder of network 300 using data path 334. The service provider system 102 may include a graphical user interface (not shown) configured to display the up-to-date conditions of one or more network elements associated with the network 300. In particular, the service provider system 102 may use a graphical user interface to display the condition of one or more ONTs 330 communicatively coupled to the network 300. Based on a review of the data displayed via the graphical user interface, a technician and/or service provider system user may initiate a reset signal using the service provider system The OLT 326 may be communicatively coupled to the data network 104 via data path 336. The OLT 326 may receive one or more data signals from the data network 104 via data path 336. The OLT 326 may also be configured to transmit data signals to one or more ONTs using data path 340. Data signals may include video signals, voice signals, and/or any other electrical information. For example, the OLT 326 may be configured to transmit data signals to one or more ONTs 330 on a specified wavelength (e.g., 1490 nm, etc.) using data path 340. The OLT 326 may also be configured to receive data signals from one or more ONTs 330 using data path 340. For example, the OLT 326 may be configured to receive data signals from one or more ONTs 330 on another specified wavelength (e.g., 1310 nm, etc.) using data path 340.

The ONT remote reset generator 302 may be communicatively coupled to the data network 104 via data path 338. The ONT remote'reset generator 302 may receive, one or more data signals from the data network 104 via data path 338. Accordingly, the ONT remote reset generator 302 may be configured to receive a reset signal and/or signal initiating a reset of the ONT 330 from the service provider system 102 via the data network 104 and data path 338. The ONT remote reset generator 302 may also combine a reset signal with a hexadecimal number, binary number, and/or any other number that may represent digital information, associated with the identity of one or more ONTs 330 that need to be reset. For example, the ONT remote reset generator 302 may combine the hexadecimal number hx0A with a reset signal if the ONT 330 associated with the decimal number 10 needs to be reset. The ONT remote reset generator may be configured to the reset-signal to one or more ONTs 330 on yet another specified wavelength (e.g., 1510 nm, etc.) via data path 304.

The optical combiner 306 may be communicatively coupled to the ONT remote reset generator 302 and the video network 310 via data path 304 and data path 308, respectively. Accordingly, the optical combiner 306 may be configured to receive data signals from the ONT remote reset generator 302 and video signals from the video network 310. The optical combiner 306 may also be configured to combine the signals received from data path 304 and data path 308 and transmit the combined signals to the PON splitter/combiner 328 via data path 312.

The PON splitter/combiner 328 may be communicatively coupled to the optical combiner 306 and the OLT 326 via data path 312 and data path 340, respectively. Accordingly, the PON splitter/combiner 328 may be configured to receive data signals and/or video signals from the optical combiner 306 and data signals from the OLT 326. The PON splitter/combiner 328 may also be configured to combine the incoming signals into a single data stream. The PON splitter/combiner 328 may also be configured to transmit the combined data stream to one or more ONTs communicatively coupled to the PON splitter/combiner 328 via data path 314.

The optical splitter 316 may be communicatively coupled to the PON splitter/combiner via data path 314. Accordingly, the optical splitter 316 may be configured to receive data signals and/or video signals from the PON splitter/combiner 328. The optical splitter 316 may split all data signals and/or video signals not associated with the specified wavelength designated for the reset signal. For example, the optical splitter 316 may transmit all data signals and/or video signalsnot associated with the specified wavelength designated for the reset signal to the ONT 330 for non-reset functionality via data path 324. In an exemplary embodiment, the PON splitter/combiner 328 may include a filter to separate the one, or more input signals into one or more output signals.

The optical splitter 316 may also be configured to transmit all data signals associated with the specified wavelength designated for the reset signal (e.g., 1510 nm, etc.) to the code detector/relay driver 318. The code detector/relay driver 318 may include software and/or hardware configured to read the hexadecimal number associated with the identity of the ONT 330 to be reset. The code detector/relay driver 318 may also include software and/or hardware configured to compare the hexadecimal number to a unique hexadecimal number stored in the memory of the ONT 330. If, for example, the hexadecimal number associated with the reset signal does not match the hexadecimal number stored in the memory of the ONT 330, the code detector/relay driver 318 may not trigger the relay function. If, however, the hexadecimal number associated with the reset signal does match the hexadecimal number stored in the memory of the ONT 330, the code detector/relay driver 318 may trigger the relay function and actuate the high speed relay 322 via data path 320. The high speed relay 322 may include software and/or hardware configured to activate the reset device 332 by activating the interrupt pin.

Figure 4A:
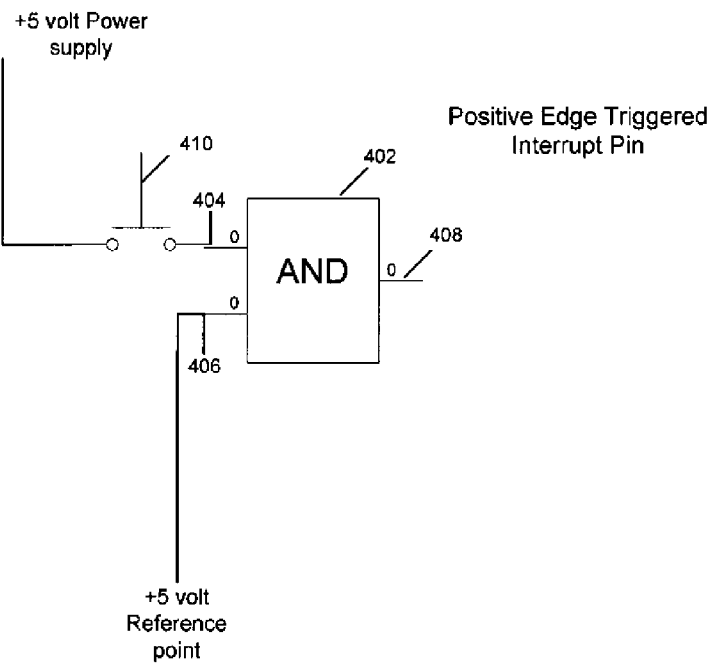
FIG. 4A illustrates a reset device circuit associated with a positive activated interrupt pin, in accordance with exemplary embodiments.

FIG. 4A illustrates a reset device circuit 400 associated with a positive activated interrupt pin, in accordance with exemplary embodiments. The reset device circuit 400 may include an AND gate 402. In an exemplary embodiment, the reset device circuit 400 may include an AND gate, NAND gate, NOR gate, OR gate, XOR gate, and/or any other device that may be used to activate a reset signal. An input pin 404 of the AND gate 402 may be conditionally connected to a power supply (e.g., +5 Volts, etc.). For example, during reset, a reset switch 410 may be activated, connecting the input pin 404 to the power supply. At other times, the reset switch 410 may not be activated and the input pin 404 may not be connected to the power supply. Another input pin 406 may be connected to a reference voltage (e.g., +5 volt, etc.) As previously discussed, the reset device circuit 400 may be positive edge triggered. Accordingly, the output pin 408 of the reset device circuit 400 may not be coupled to an inverter.

Figure 4B:
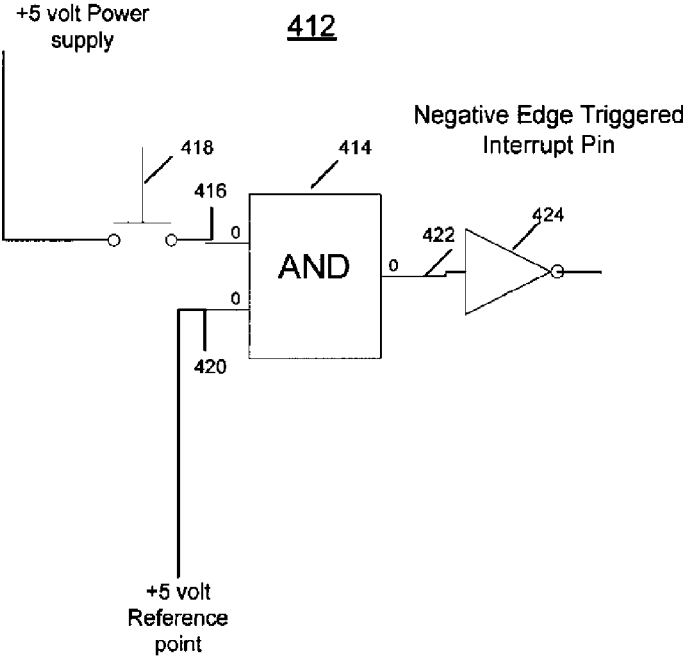
FIG. 4B illustrates a reset device circuit associated with a ground activated interrupt pin, in accordance with exemplary embodiments.

FIG. 4B illustrates a reset device circuit 412 associated with a ground activated interrupt pin, in accordance with exemplary embodiments. The reset device circuit 412 may include an AND gate 414. In an exemplary embodiment, the reset device circuit 412 may include an AND gate, NAND gate, NOR gate, OR gate, XOR gate, and/or any other device that may be used to activate a reset signal. An input pin 416 of the AND gate 414 may be conditionally connected to a power supply (e.g., +5 Volts, etc.). For example, during reset, a reset switch 418 may be activated, connecting the input pin 416 to the power supply. At other times, the reset switch 418 may not be activated and the input pin 416 may not be connected to the power supply. Another input pin 420 may be connected to a reference voltage (e.g., +5 volt, etc.) As previously discussed, the reset device circuit 412 may be negative edge triggered. Accordingly, the output pin 422 of the reset device circuit 412 may be coupled to an inverter 424.

Figure 5:
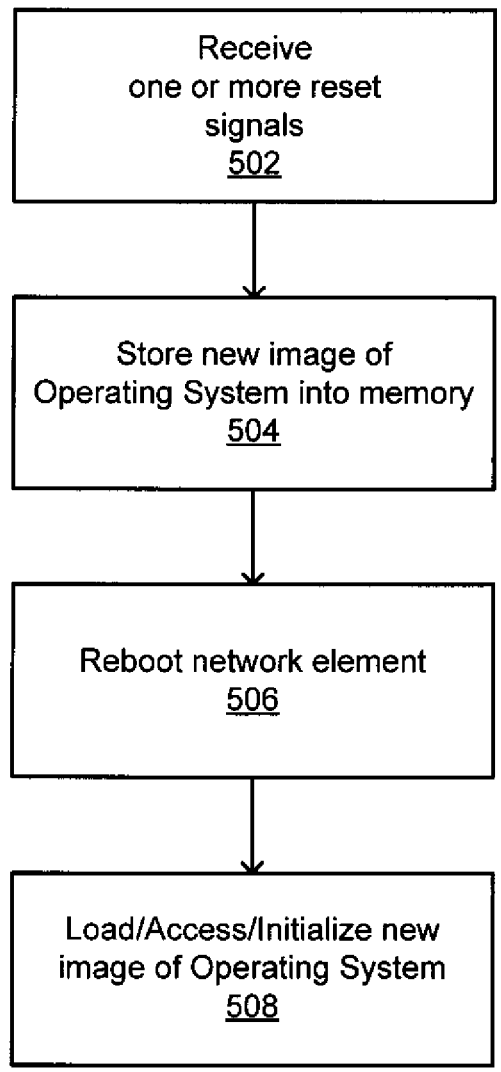
FIG. 5 illustrates a method for manually resetting a network element associated with a network, in accordance with exemplary embodiments.

FIG. 5 illustrates a method for manually resetting a network element associated with a network, in accordance with exemplary embodiments. This exemplary method is provided by way of example, as there are a variety of ways to carry out methods disclosed herein. The method 500 shown in FIG. 5 can be executed or otherwise performed by one or a combination of various networks and/or network elements. The method 500 is described below as carried out by the network element 112 shown in FIG. 1 by way of example, and various elements of the network element 112 of network 100 are referenced in explaining the example method of FIG. 5. Each block shown in FIG. 5 represents one or more processes, methods, or subroutines carried in the exemplary method 500. Referring to FIG. 5, the exemplary method 500 may begin at block 502.

In block 502, the method 500 may include the network element 112 receiving a reset signal from the service provider system 102 via the data network 104. Reset signals may include one or more signals to initiate the graceful rebooting of the network element 112. The method 500 may continue to block 504.

In block 504, the network element 112 may store a new image of the operating system associated with the network element 112 in memory. A new image of the operating system may include a configured set of one or more software programs to be installed on the network element 112. The method 500 may continue to block 506.

In block 506, after the new image of the operating system associated with the network element 112 is stored in memory, the network element 112 may be reinitialized. Re-initialization may include rebooting and/or restarting a system using a non-maskable interrupt and/or a system reset by interrupting power and/or removing power (e.g., power cycling, hard rebooting, etc.). The method 500 may continue to block 508.

In block 508, upon rebooting, the network element 112 may access and/or initialize the previously stored image of the operating system associated with the network element 112. The method 500 may end.

Figure 6:
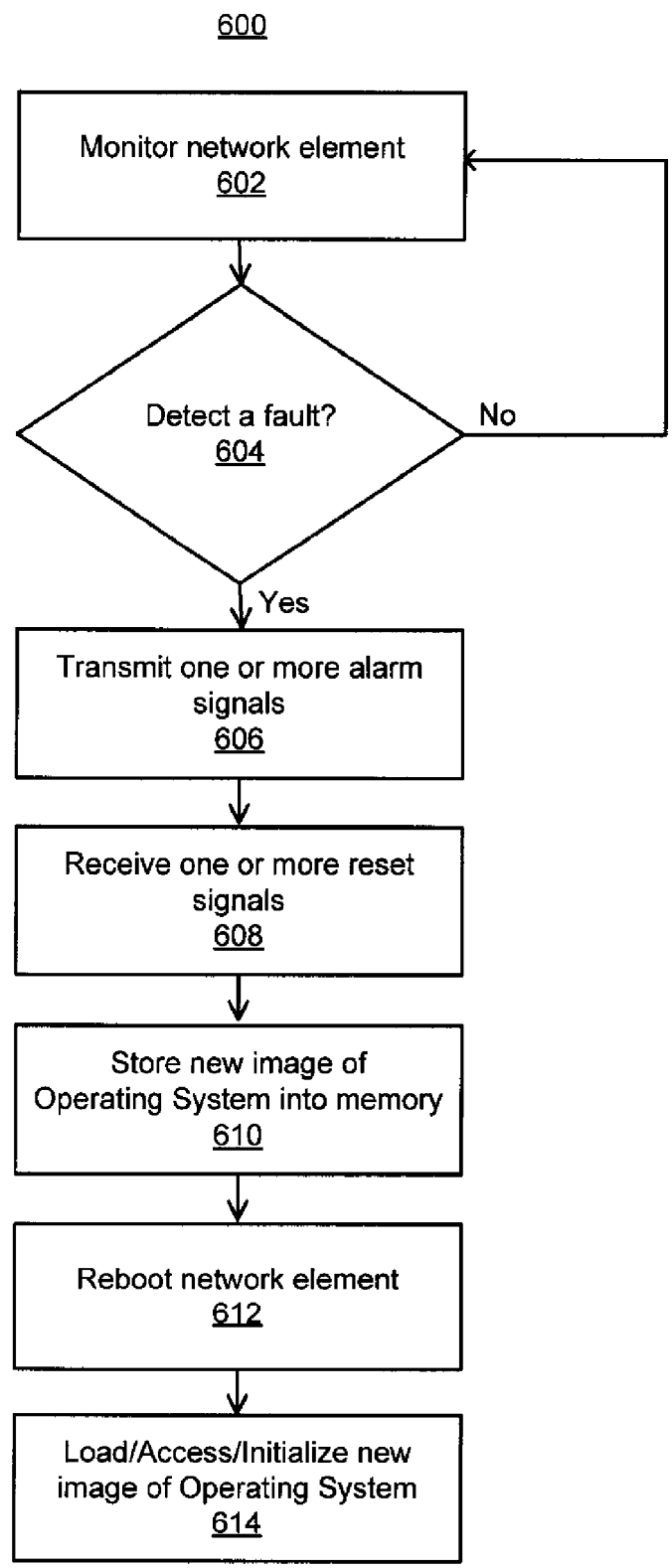
FIG. 6 illustrates a method for remotely resetting a network element associated with a network, in accordance with exemplary embodiments.

FIG. 6 illustrates a method for remotely resetting a network element associated with a network, in accordance with exemplary embodiments. This exemplary method is provided by way of example, as there are a variety of ways to carry out methods disclosed herein. The method 600 shown in FIG. 6 can be executed or otherwise performed by one or a combination of various networks and/or network elements. The method 600 is described below as carried out by the network element 112 shown in FIG. 1 by way of example, and various elements of the network element 112 of network 100 are referenced in explaining the example method of FIG. 6. Each block shown in FIG. 6 represents one or more processes, methods, or subroutines carried in the exemplary method 600. Referring to FIG. 6, the exemplary method 600 may begin at block 602.

In block 602, the method 600 may include the fault detection module 208 associated with the network element 112 monitoring the processing module 204 to determine if the operating system associated with the processing module 204 is in a latched-up condition and/or unresponsive condition. In an exemplary embodiment, monitoring the processing module 204 may include receiving one or more error signals from the processing module 204. In another embodiment, monitoring the processing module 204 may include transmitting one or more status request signals to the processing module 204. The method 600 may continue to block 604.

In block 604, the method 600 may include the fault detection module 208 determining if the processing module 204 is in a latched-up condition and/or unresponsive condition. If, for example, the fault detection module 208 determines that the processing module 204 is not in a latched-up condition or unresponsive condition, the method 600 may continue to block 602. If, however, the fault detection module 208 determines that the processing module 204 is in a latched-up condition or unresponsive condition, the method 600 may continue to block 606.

In block 606, the method 600 may include the fault detection module 208 transmitting one or more alarm signals to the service provider system 102 via the data network 104. Alarm signals may include information in the form of electrical signals indicating that the network element 112 from which it was transmitted is in a latched-up condition and/or unresponsive condition. The method 600 may continue to block 608.

In block 608, the method 600 may include the network element 112 receiving a reset signal from the service provider system 102 via the data network 104 in response to the alarm signal. Reset signals may include one or more signals to initiate the graceful rebooting of the network element 112. The method 600 may continue to block 610.

In block 610, the method 600 may include the network element 112 storing a new image of the operating system associated with the network element 112 in memory. A new image of the operating system may include a configured set of one or more software programs to be installed on the network element 112. The method 600 may continue to block 612.

In block 612, the method 600 may include reinitializing the network element 112, after the new image of the operating system associated with the network element 112 is stored in memory. The method 600 may continue to block 614.

In block 614, the method 600 may include the network element 112 may accessing and/or initializing the previously stored image of the operating system associated with the network element 112 upon booting up. The method 600 may end.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
   detecting a fault associated with a network element including at least a processing module, a fault detector module and a communication module wherein said fault detector module determines if said processing module is in a latched-up or un-responsive condition and if not, said communication module communicates other than said condition to said network by sending a plurality of periodically-transmitted alive signals from said network element while said network element is in proper working, condition and if so, said communication module communicates said condition to said network by responding to receipt of a plurality of pinging request signals transmitted to said network element in response to not transmitting said alive signals for a predetermined period of time;
   receiving a reset signal in response to the fault detection;
   storing a new image of an operating system of the network element into memory associated with the network element in response to receiving the reset signal;
   rebooting the network element; and
   loading the stored new image of the operating system from the memory associated with the network element.

2. The method of claim 1, wherein detecting the fault further comprises detecting that the network element is in a latched-up condition.

3. The method of claim 1, wherein detecting the fault further comprises detecting that the network element is in an unresponsive condition.

4. The method of claim 1, further comprising transmitting an alarm signal to a service provider system in response to the fault detection.

5. The method of claim 4, further comprising receiving the reset signal from the service provider system, wherein the service provider system is remote from the network element.

6. The method of claim 4, wherein the reset signal is transmitted from the service provider system to the network element using a specified wavelength.

7. The method of claim 1, further comprising generating the reset signal at the network element in response to the fault detection.

8. The method of claim 7, wherein the initiation of the reset signal is caused by the activation of a reset toggle that is operatively coupled to the network element.

9. The method of claim 1, wherein the network element comprises an optical network terminal.

10. The method of claim 1, wherein the network comprises a passive optical network.

11. A non-transitory physical medium comprising code which when executed by a processor performs the acts of the method of claim 1.

12. A fault-handling system, comprising:
   at least one physical and logical network element including at least a processing module, a fault detector module and a communication module communicatively coupled to a network where the system is configured to:
   detect a fault by determining if said processing module is in a latched-up or un-responsive condition and if not, said communication module communicates other than said condition to said network by sending a plurality of periodically-transmitted alive signals from said network element while said network element is in proper working condition and if so, said communication module communicates said condition to said network by responding to receipt of a plurality of pinging request signals transmitted to said network element in response to said network not receiving said alive signals for a predetermined period of time, said fault being associated with the network element;
   receive a reset signal in response to the fault detection;
   store a new image of an operating system of the network element into memory associated with the network element in response to receiving the reset signal;
   reboot the network element; and
   load the stored new image of the operating system from the memory associated with the network element.

13. The system of claim 12, wherein the network element is further configured to transmit an alarm signal to a service provider system in response to the fault detection.

14. The system of claim. 13, wherein the reset signal is received from the service provider system, wherein the service provider system is remote from the network element.

15. The system of claim 13, wherein the reset signal is transmitted from the service provider system to the network element using a specified wavelength.

16. The system of claim 12, wherein the reset signal is generated at the network element in response to the fault detection.

17. The system of claim 12, wherein the network element comprises an optical network terminal.

18. The system of claim 12, wherein the network comprises a passive optical network.

19. A device, comprising:
   a physical and logical network element including at least a processing module, a fault detector module and a communication module wherein said fault detector module determines if said processing module is in a latched-up or an-responsive condition and if not, said communication module communicates other than said condition to said network by sending a plurality of periodically-transmitted alive signals from said network element while said network element is in proper working condition and if so, said communication module communicates said condition to said network by responding to receipt of pinging request signals transmitted to said network element in response to said communication module not transmitting said alive signals for a predetermined period of time, said network element operatively coupled to a reset device circuit wherein the reset device circuit is configured to:
   activate a reset toggle associated with the network element in response to receiving a reset signal, said reset signal, in turn, responsive to said fault detector module determining said condition.

20. The device of claim 19, wherein the network element comprises an optical network terminal.

* * * * *